(12) United States Patent
Denteneer

(10) Patent No.: US 8,666,008 B2
(45) Date of Patent: Mar. 4, 2014

(54) SYNCHRONIZATION PROTOCOL

(75) Inventor: Theodorus J. J. Denteneer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 549 days.

(21) Appl. No.: 12/602,792

(22) PCT Filed: Jun. 9, 2008

(86) PCT No.: PCT/IB2008/052264
§ 371 (c)(1),
(2), (4) Date: Dec. 3, 2009

(87) PCT Pub. No.: WO2008/152567
PCT Pub. Date: Dec. 18, 2008

(65) Prior Publication Data
US 2010/0172454 A1    Jul. 8, 2010

(30) Foreign Application Priority Data
Jun. 13, 2007  (EP) ..................... 07301106

(51) Int. Cl.
*H04L 7/00*   (2006.01)
(52) U.S. Cl.
USPC .......................................... 375/356; 375/354
(58) Field of Classification Search
USPC ............ 375/354, 356; 709/248; 713/375, 400
See application file for complete search history.

(56) References Cited

U.S. PATENT DOCUMENTS

| | | | | |
|---|---|---|---|---|
| 7,706,822 | B2 * | 4/2010 | Emeott et al. | 455/502 |
| 2001/0039629 | A1 * | 11/2001 | Feague | 713/400 |
| 2006/0227913 | A1 * | 10/2006 | Sedarat | 375/354 |
| 2006/0242279 | A1 * | 10/2006 | Chen et al. | 709/221 |
| 2007/0050523 | A1 | 3/2007 | Emeott et al. | |
| 2008/0077668 | A1 * | 3/2008 | Oh et al. | 709/205 |
| 2008/0267105 | A1 * | 10/2008 | Wang et al. | 370/311 |

FOREIGN PATENT DOCUMENTS

WO    02058276 A1    7/2002

* cited by examiner

*Primary Examiner* — Jean B Corrielus
(74) *Attorney, Agent, or Firm* — Larry Liberchuk

(57) ABSTRACT

An efficient synchronization procedure applicable to mesh WLAN based on the 802.11s standard is proposed. A first and second stations initiate the process and establish a communication link between them. Next, the first station transmits to the second station a synchronization element that contains: a capability information element indicative of a capability of the first station to synchronize, and a status information element indicative of whether the first station has established a synchronized peer link with another station. One of the two stations may then initiate the actual handshake for synchronization. The initiator transmits a request for synchronization and receives a response from the other station representative of the acceptance by the other station of the synchronization, the request and the acceptance being restrained in that the stations may not entertain conflicting synchronization procedures with different links. The request may include a set of the synchronization profile.

15 Claims, 2 Drawing Sheets

SYNCHRONIZATION PROTOCOL

FIELD OF THE INVENTION

The invention relates to a method for synchronizing two stations over a wireless network. The invention is particularly relevant to mesh wireless networks, in particular mesh WLAN (wireless local area network) based on the IEEE 802.11s standard.

BACKGROUND OF THE INVENTION

The IEEE 802.11s standardization committee group is currently working on an extension of the 802.11 standard for such type of networks. The current IEEE 802.11s standard specification, version D1.03, incorporated herein by reference, defines an IEEE 802.11 Wireless LAN (WLAN) Mesh using the IEEE 802.11 MAC/PHY layers that supports both individually addressed and group addressed delivery over self-configuring multi-hop topologies. Mesh networks according to the 802.11s standard, or so-called meshes, operate as wireless co-operative communication infrastructures between numerous individual wireless transceivers. A mesh may be centralized or decentralized. Stations or mesh nodes (MP) in the mesh communicate with their neighboring adjacent nodes only and thus act as repeaters to transmit message data from nearby nodes to peers that are too far to reach. Terminology specific to the 802.11s standard will be used in the following paragraphs to illustrate the invention and whenever applicable, the terms used should be understood as defined in the 802.11s standard.

By definition, in a network based on the 802.11s standard mesh points MPs communicate over a mesh. A mesh includes two or more mesh points. A mesh point MP is an IEEE 802.11 entity that contains an IEEE 802.11-conformant medium access control and physical layer interface to the wireless medium that supports mesh services as defined in the 802.11s standard.

Mesh points are synchronized when they have established a common time reference thereby enabling efficient reservation of the wireless medium for data transfer, beaconing and advanced power save modes. The current 802.11s specification defines a protocol for synchronization if mesh points desire to synchronize with one another. Synchronization is not mandatory over a mesh however, when feasible, it greatly improves communication between mesh points. 802.11s D1.03 defines a synchronization capability field (see 802.11s D1.03 7.3.2.53.5 Synchronization Capability field) with 3 sub-fields: a Supporting Synchronization sub-field, a Synchronizing with peer MP subfield and a Synchronizing with peer MP subfield. The Supporting Synchronization sub-field is set to 1 if the MP supports timing synchronization with peer MPs and 0 otherwise. The Requests Synchronization from Peer subfield is set to 1 if the MP requests MP peers attempting to communicate with it to synchronize with it and 0 otherwise. The Synchronizing with peer MP subfield set to 1 if the non-access point MP is currently a synchronizing MP and 0 otherwise. The synchronization capability field is contained in a mesh capability element as explained in 802.11s 7.3.2.53 to advertise mesh services. It is contained in Beacon frames transmitted by MPs and is also contained in probe request/response messages and (re)association request/response messages. In the current synchronization procedure, synchronization is treated as a mesh-wide property and the parameters for this mesh wide property are established by the MP that initiates the mesh, see Section 11A10.3.2.

However, this procedure has various disadvantages. Firstly, it can happen that the MP that establishes the mesh does not initiate synchronization, and this could then never be changed, and the mesh could not develop into a synchronized mesh. Secondly, the procedure is unclear as to what happens when two or more MPs simultaneously start a mesh. Thirdly, the procedure is unclear as to what happens if two synchronized meshes need to be merged.

SUMMARY OF THE INVENTION

It is an object of the invention to propose a simple synchronization procedure in a mesh.

It is another object of the invention to overcome the drawbacks of a mesh-wide synchronization as defined in the current 802.11s synchronization procedure.

To this end, the invention relates to a synchronization method between a first and a second station over a mesh wireless network. The two stations first establish a communication link between them According to the invention the first station transmits to a second station a synchronization element containing a capability information bit indicative of a capability of the first station to synchronize with another station and a status information bit indicative of whether the first station has established a synchronized peer link with another station in a mesh to which the second station belongs. One of the two stations also transmits to the other station a request for synchronization receives a response representative of the acceptance by the second station of the synchronization procedure. The other station is constrained to accept the synchronization if it does not conflict with another currently synchronization.

Prior to any synchronization procedure, a link must be established between the two stations. During peer-link establishment, stations may advertise to each other their respective attributes. Peer-link establishment is often specific to the communication standard in use over the wireless network and no details will be given here. Synchronization and peer-link establishment could be dissociated however both steps can easily be merged and carried out in parallel in the a handshake exchange between the two stations.

A synchronization method of the invention employs two bits to communicate the synchronization status of a given mesh point. The status of the two bits is specific to a given mesh point and does not indicate a general synchronization of the whole mesh although one can infer whether a mesh is fully synchronized, not synchronized or partly synchronized from the status of the two bits of all mesh points present in the mesh. A mesh may include mesh points that are not capable of synchronizing in general and such mesh is at best only partly synchronized. Also, a mesh may have different synchronization profiles that coexist.

The capability information bit is comparable with the Supporting Synchronization bit of the 802.11s D1.03 in that it indicates if the mesh point associated with it supports timing synchronization with peer mesh points.

In an examplary embodiment, the status information bit may be set to 1 if the station is synchronized and 0 if the station is not synchronized with its peer stations in the mesh. Status information bit may also be set to 0 if the first station is currently carrying a synchronization process which is not finalized. Status 1 indicates that the first station is synchronized with its peer stations in the mesh, or at least with the ones that also indicate a status information bit of 1. However a status information bit set to 1 may not necessarily indicate that the first station is synchronized with the second station. Indeed, for example, the first and second stations may belong to distinct meshes that are independently synchronized with no common clock. In such case, a status 1 would only indicate that the first station is synchronized with peer mesh points in the mesh to which it belongs but not with the mesh points in the other mesh, including the second station.

The invention covers the following case scenarios.

First, the first and second stations may belong to the same mesh and one of the two stations has recently joined the mesh. The mesh was previously synchronized. The invention provides a procedure that the new station, either the first or the second station, will follow to adopt the synchronization parameters of the mesh. In an examplary embodiment, the first station joins the existing mesh and requests synchronization. In another examplary embodiment, the second station joins the mesh and the first station present in the mesh transmits the request to the second station joining the network.

Next, in another scenario, the first and second stations belong to two distinct meshes and attempt to synchronize with each other. This situation may occur when two meshes merge. As will be explained hereinafter, once the stations are synchronized in pair, the synchronization protocol can be propagated to other peer mesh points not yet synchronized in either mesh.

The invention further covers a third situation where two synchronization protocols coexist in the mesh. The first and second stations, each having its own set of synchronization parameters attempt to synchronize in the aim to have only one synchronization profile in the mesh in the end.

The inventors have realized that simplification of the existing synchronization protocol of the 802.11s D1.03 standard was greatly needed and have thus devised a synchronization procedure that permits to initially restrict the synchronization to a limited number of mesh points or even a pair of mesh points MPs. A further advantage of one or more embodiments is that the invention uses at its best the capability of organically spreading information and control data over a mesh. Indeed, mesh points MPs act as repeaters to communicate the synchronization parameters over the entire mesh.

The foregoing has outlined rather broadly the features and technical advantages of the present invention so that those skilled in the art may better understand the Description of the Drawings that follows. One should appreciate that he may readily use the conception and the specific embodiments disclosed as a basis for modifying or designing other structures for carrying out the same purposes of the present invention.

BRIEF DESCRIPTION OF THE DRAWINGS

For a more complete understanding of the present invention, and the advantages thereof, reference is now made to the following description taken in conjunction with the accompanying drawings, wherein like numbers designate like objects, and in which.

DETAILED DESCRIPTION OF EMBODIMENTS

Figure 1:
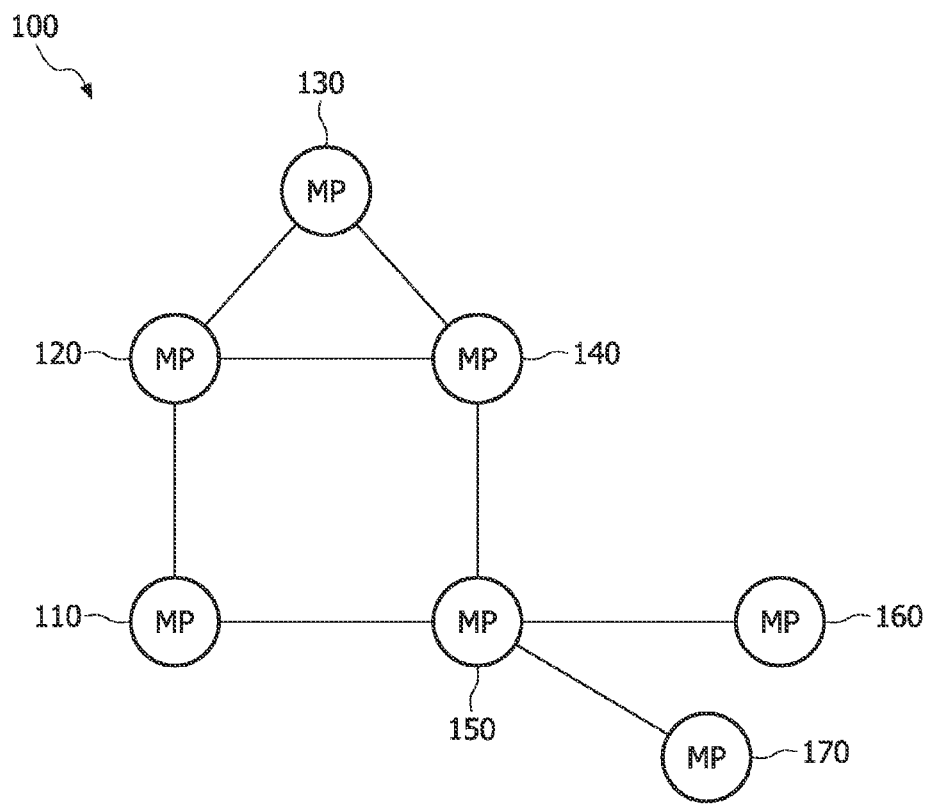
FIG. 1 is a mesh according to the invention.

FIG. 1 shows mesh 100 based on the 802.11s D1.03 specification. Mesh 100 includes mesh points (MP) 110-170. In this embodiment mesh 100 is decentralized, i.e. there is no central controller, and MPs 110-170 communicate using a multi-hop technology where MPs 110-170 may only communicate with nearby MPs that have established a link. Two stations have established a link when they have successfully carried out a link establishment procedure. For example, 802.11s D1.03 describes a link establishment procedure in section 11A.1. The link establishment procedure and the synchronization procedure may be dissociated in time or carried out simultaneously depending on implementation.

FIG. 1 shows links set up between MPs 110-170. For example, MP 120 may only communicate directly with MPs 130, 140 and 110 and MP 120 may also communicate with MP 150 indirectly via MP 110 or MP 140.

In order to facilitate data transfer and control over mesh 100, mesh 100 may be synchronized. Two MPs have established a synchronized link if the MPs share the values for a set of time parameters and have agreed upon a procedure for maintaining these parameters. These parameters may be for example: the mesh time, the start time of the mesh super-frame the start of the next super-frame and/or the duration of the mesh super-frame. In the invention, contrary to the previous 802.11s D1.03 standard, synchronization is dealt with at the level of an MP pair instead of being a mesh wide property. An advantage of this approach is that it renders the overall synchronization procedure more flexible. Synchronization is thus particular to a communication or so-called peer-link between two MPs. As a consequence, mesh 100 may be fully synchronized in which case all MPs 110-170 share the same synchronization parameters, partly synchronized, i.e. only selected MPs 110-170 share the same synchronization profile or not synchronized at all. A given MP will nevertheless not associate a synchronization profile with a link that conflicts with other profiles associated with other links that are currently open. The proposed protocol also defines how a given synchronization profile may be propagated through the mesh. Propagation may not be mandatory and this may be left to implementers choice.

In an exemplary embodiment, mesh 100 allows individual MPs 110-170 to maintain two sets of synchronization profiles: an empty profile, thus not synchronized and a synchronization profile. One may also devise a protocol where more than two profiles exist at a given MP, however such implementation will not be described but can be easily devised from the following description.

During set-up, MPs 110-170 may become aware of each other's synchronization capabilities. In the assumption that each MP holds only two synchronization profiles, MPs can advertise their synchronization capability by means of a synchronization capability element of 1 bit. This synchronization capability element is set to 1 if the respective MP can support synchronization and 0 otherwise. The synchronization capability element may be included in mesh beacons that all MPs transmit or in control and/or data frames that are exchanged during the peer-link establishment procedure. In the event that MPs can support more synchronization profiles, the synchronization element may include several bits indicating what profiles are supported. A look up table where profiles are stored may be available at all MPs and MPs refer to the entry in the table to indicate the supported profile(s).

In the invention, a second additional element is introduced, namely a status information element to signal whether the MP transmitting it has already established a synchronized link with another MP.

Figure 2:
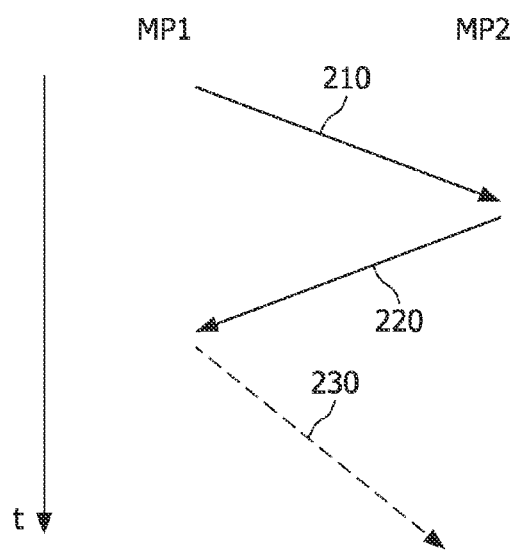
FIG. 2 shows a handshake diagram for synchronization between two mesh points.

FIG. 2 shows communication handshake between MP1 and MP2 for synchronization. Prior to attempting to synchronize with each other, MP1 and MP2 have established a peer link according to the procedure defined in the 802.11s D1.03 standard. During the procedure the above cited empty synchronization profiles of MP1 and MP2 are by default associated indicating that the link is initially not synchronized. In an embodiment of the invention, there can be only one profile associated with any link between two MPs. By means of the proposed procedure, MPs must come to agree on this profile. Additionally, the profile may not conflict with other already existing profiles. Hence, initially and by default, the empty profile is associated with the link and MP1 and MP2 are aware of this fact. This does not conflict with any other profile that may exist because the empty profile concords with any other profile.

In this embodiment, MP1 attempts to modify the existing non-synchronized link between MP1 and MP2 into a synchronized link. To do that, MP1 transmits a request synchronization message 210 to peer MP2. Message 210 may include the synchronization capability element and the status information element respectively representative of the synchronization capability and synchronization status of MP1, that is bits "11".

Message 210 may further include a synchronization profile that MP1 proposes for the profile to be associated with the link between MP1 and MP2. The proposed synchronization profile may be currently supported by MP1 in its communications with another peer MP. Alternatively, message 210 may contain no profile and MP1 leaves it to MP2 to propose a profile.

It must be noted that in principle, MP1 will only attempt to synchronize the peer-link between MP1 and MP2 if MP2 supports synchronization. MP1 may be aware of MP2 capabilities by MP2 having beforehand advertised its capability and status using the two one-bit elements of the invention during link establishment. However MPs that lack the ability to synchronize and that nevertheless receive request for synchronization messages of the type mentioned above may simply ignore or deny the request.

In the example of FIG. 2, MP2 is capable of synchronizing with another peer MP and thus reacts to message 210 by means of synchronization response message 220. Message 220 may contain an accept, a decline or a decline with a proposed altered profile. Message 220 may also contain parameters for a synchronization profile if MP1 had initially not submitted a proposal for the profile. If MP2 accepts the synchronization parameters received from MP1, the peer-link between MP1 and MP2 is from this point on, synchronized. Synchronization may also be established once confirmation that response message 220 is transmitted or after a fixed period of time after message 220 is sent depending on the communication protocol in place on the mesh. Next, MP1 and MP2 update their respective status information bits so that it reflects the current synchronized status.

In the situation where message 220 includes a strict decline or if MP2 ignores request 210 and does not transmit message 220, the peer link between MP1 and MP2 remains non-synchronized. Such situation may occur when MP1 and MP2 belong to distinct meshes supporting non-compatible synchronization parameters or when MP2 is new to the mesh of MP1 and is not capable of synchronizing.

In the situation where message 220 includes a decline with altered synchronization parameters, MP1 may further accept or decline in a synchronization response 230. In a similar fashion if MP1 had not initially offered synchronization parameters, message 220 may include proposed parameters that MP1 can accept or refuse. The above scenario may typically occur when two distinct meshes merge. MP1 and MP2 each belongs to one of the two independent meshes (or parts of the same mesh where several synchronization profiles coexist) and attempt to synchronize. If the proposed handshake is successful, it is then beyond the scope of the invention whether synchronization is propagated to other peer MPs of either mesh. The one of the two between MP1 and MP2 that has adopted new parameters does so by using the described handshake on links established with other peers.

In general the following rules apply.

If the synchronization request message 210 contains the non-empty profile of MP1 and MP2 is not synchronized with other peers, MP2 accepts the non-empty profile.

If the synchronization request message 210 contains the non-empty profile of MP1 and MP2 is synchronized with other peers, MP2 may accept the non-empty profile of MP1, decline the non-empty profile of MP1 or propose its own non-empty profile.

If the synchronization request message 210 contains the empty profile of MP1 and MP2 is synchronized with other peers, MP2 proposes to MP1 in message 220 its current non-empty profile.

If the synchronization request message 210 contains the empty profile of MP1 and MP2 is not synchronized with other peers, MP2 proposes to MP1 in message 220 its current non-empty profile.

The first and third situations often correspond to a situation in which one of the MP1 or MP2 is new to a synchronized mesh. It must be noted that in such case synchronization may be initiated either by the node joining the mesh or by one of the nodes of the synchronized mesh. Alternatively, like the fourth situation, they can also correspond to a situation in which a node introduces synchronization in a mesh by synchronizing its link with a neighbor.

The second situation typically would correspond to the case where two meshes merge. Two meshes may merge via a non-synchronized link, i.e. neither of MP1 and MP2 attempts to synchronize the new link between the two meshes. Alternatively, MP1 or MP2 attempts to synchronize the link by sending a synchronization request message 210 with a specific profile to its peer.

Figure 3:
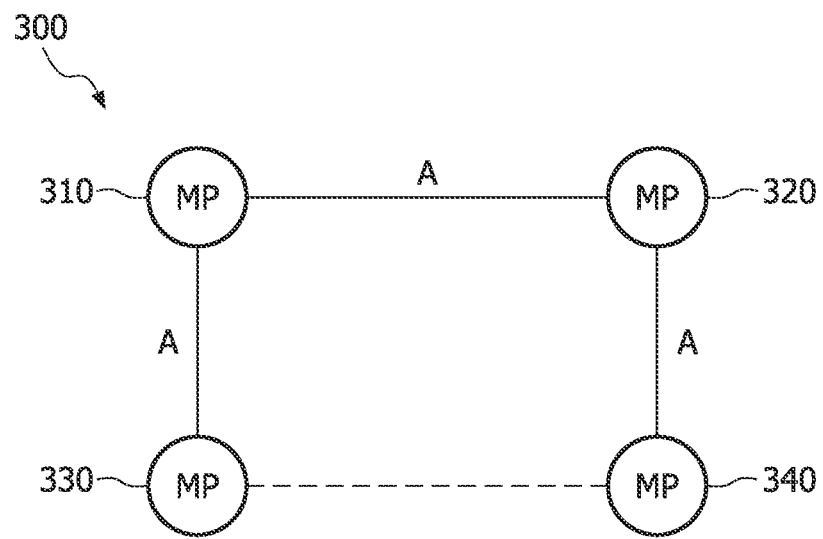
FIG. 3 shows a mesh to illustrate synchronization between two stations in the mesh according to the invention; and, FIG. 4 shows two meshes where synchronization occurs between mesh points of each mesh.

Often when MP2 receives the non-empty profile of MP1 in message 210, it will compare it with its own profile. At least it will check whether it conflicts or coincides. A typical situation is depicted in FIG. 3 where only profile A exists in mesh 300. All MPs 310-340 have established synchronized links with their respective nearby peers and all share synchronization profile A. Only peer-link between MP330 and 340, shown in dashed line, is not synchronized. MPs 330 and 340 attempt to synchronize using the handshake exchange previously detailed in reference to FIG. 2. In this situation, MP340 will accept the profile (assuming MP 330 is the initiator of the process) without altering its own profile. The synchronization of mesh 300 will thus be successful.

Figure 4:
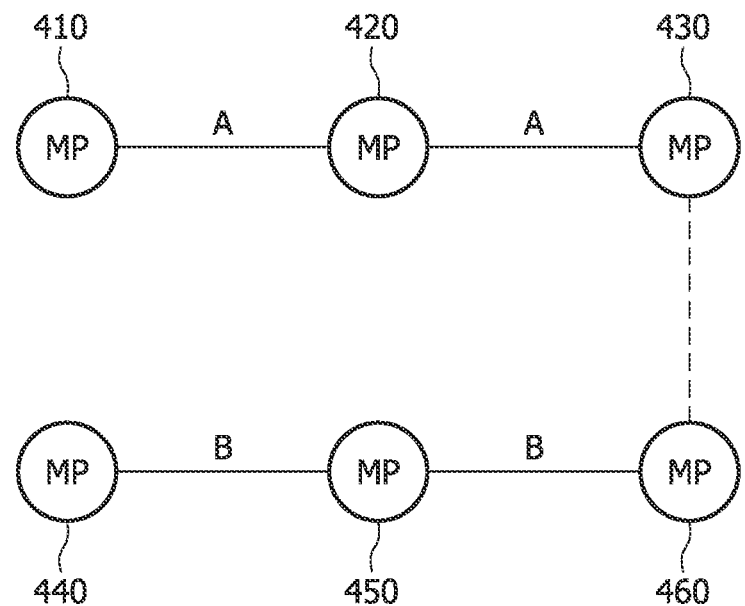

Another situation is depicted in FIG. 4 where MPs 410-430 share the same profile A and MPs 440-460 share the same profile B, not compatible with profile A. MPs 410-460 may all belong to the same mesh or to two distinct meshes. MPs 430 and 460 attempt to synchronize, and to this end, MP 430 initiates the process and transmits its profile in message 210. MP 460 checks the received profile of MP 430 and realizes that it does not coincide and conflicts with its own profile. MP 460 cannot accept the profile without altering its own profile.

If MP 460 decides to accept the profile that conflicts with its current profile, MP 460 will set its 1-bit status information element to 0 to signal to its nearby peers, e.g. MP 450, that it is not synchronized with them. Peer MPs will temporarily ignore MP 460 when updating the parameters associated with their synchronization profile. MP 460 may then send a synchronization request message 210 to its peer MPs with which it has established a peer link with a distinct and conflicting synchronization profile, profile B in this embodiment. MP 460 negotiates a new synchronization profile for this existing link that does not conflict with the profile of its own link, namely profile A. The negotiated profile may be an empty profile to indicate that the link is not synchronized. The "re"synchronization also implies a tear down of other agreements between the MPs which depend on the synchronization. An example of this is provided by the reserved time slots for data communication (termed MDAOPs in the draft version D1.03 of 802.11s) that may have existed between these two MPs.

As soon as MP 460 has reached synchronization with at least one its peer neighbor MPs, it then sets its status information element to 1 to signal that it is synchronized with peer MPs.

In another embodiment, priority values may further be included in the synchronization request message 210 to associate a priority with the proposed profile so as to coerce a given profile.

Also, as an alternative to actively sending a synchronization request message 210, MP1 could set a request bit in a broadcast frame, such as a beacon and the request bit could force neighbors to copy the synchronization profile.

The above-described process can be carried out by computer executable instructions, when executed by a computer, which are stored on a non-transitory computer readable medium.

The invention claimed is:

1. A method for synchronizing a first station and a second station over a mesh wireless network, the method comprising:
    establishing a communication link between the first station and the second station;
    transmitting from the first station a request for synchronization including a synchronization element containing a capability information element indicative of a capability of the first station to synchronize and a status information element indicative of whether the first station has established a synchronized peer link with a different station in the mesh wireless network;
    receiving a response to the request for synchronization representative of acceptance of the request for synchronization, wherein a station accepts the request for synchronization when synchronization does not conflict with another synchronization currently supported by the station.

2. The method of claim 1, further comprising:
    attempting to change parameters of an existing synchronization that conflicts with the synchronization request transmitted by the first station.

3. The method of claim 1, wherein the capability information element and the status information element are 1-bit words.

4. The method of claim 1, wherein the synchronization element contains more than one capability information bit.

5. The method of claim 1, wherein the request for synchronization includes a synchronization profile indicative of synchronization parameters.

6. The method of claim 5, wherein a response to the request for synchronization including the synchronization profile is representative of an acceptance of the synchronization profile.

7. The method of claim 6, wherein the first station and the second station update their respective status information elements to indicate that the respective first station and the second station is synchronized upon acceptance of the request for synchronization.

8. The method of claim 1, further comprising:
    receiving at the first station from the second station another synchronization information element containing a capability information bit indicative of a capability of the second station to synchronize with the first station and a status information bit indicative of whether the second station has established a synchronized peer link with a different station in the mesh wireless network.

9. The method of claim 8, further comprises:
    determining at the first station whether the second station is configured for synchronizing with the first station from the capability information element of the synchronization information element received from the second station; and
    transmitting the request for synchronization from the first station if the second station is configured for synchronizing with the first station.

10. The method of claim 1, wherein the capability information element is contained in one of the following frames: a mesh beacon and a frame exchanged between the first station and the second station during a peer link establishment procedure between the first station and the second station.

11. The method of claim 1, wherein the establishing the communication link and the transmitting the synchronization element are simultaneous.

12. The method of claim 1, wherein the wireless network and the first station and the second station are based on the IEEE 802.11s standard.

13. A station in a mesh wireless network comprising:
    a transceiving arrangement for establishing a communication link with another station over the mesh wireless network;
    a synchronization profile arrangement for storing a synchronization profile and generating a synchronization element containing a capability information element indicative of a capability of the first station to synchronize with the other station and a status information element indicative of whether the station has an existing synchronized peer link in the mesh wireless network and transmitting the synchronization element to the other station;
    a synchronization arrangement for transmitting to the other station a request for synchronization and determining whether to modify the synchronization element on the basis of a response from the other station representative of acceptance by the other station of the synchronization profile, the other station accepting the request for synchronization when synchronization does not conflict with another synchronization currently supported by the other station.

14. The station of claim 13, wherein the synchronization arrangement further transmits to the other station a set of synchronization parameters representative of the synchronization profile.

15. A non-transitory computer readable medium storing computer executable instructions for carrying out, when executed by a computer, a process comprising:
    establishing a communication link between a first station and a second station over a mesh wireless network;
    transmitting from the first station a request for synchronization including a synchronization element containing a capability information element indicative of a capability of the first station to synchronize and a status information element indicative of whether the first station has established a synchronized peer link with a different station in the mesh wireless network;

receiving a response to the request for synchronization representative of acceptance of the request for synchronization, wherein a station accepts the request for synchronization when synchronization does not conflict with another synchronization currently supported by the station.

\* \* \* \* \*